United States Patent [19]
Cook et al.

[11] Patent Number: 5,223,013
[45] Date of Patent: * Jun. 29, 1993

[54] METHOD FOR MAKING MULTIFIBER ASSEMBLY FROM PRIMITIVE TILES

[75] Inventors: Lee M. Cook, Spencer; Danna A. Mancini, Worcester; Susan M. Patterson, Watertown, all of Mass.

[73] Assignee: Galileo Electro-Optics Corp., Sturbridge, Mass.

[*] Notice: The portion of the term of this patent subsequent to Sep. 17, 2008 has been disclaimed.

[21] Appl. No.: 682,191

[22] Filed: Apr. 8, 1991

Related U.S. Application Data

[63] Continuation of Ser. No. 549,907, Jul. 9, 1990, Pat. No. 5,049,176, which is a continuation-in-part of Ser. No. 371,065, Jun. 26, 1989, abandoned.

[51] Int. Cl.⁵ .................. C03B 37/023; G02B 5/16
[52] U.S. Cl. .......................... 65/4.2; 65/36; 65/4.21; 385/116; 428/188
[58] Field of Search ............ 65/2, 4.2, 4.3, 36, 65/4.21; 428/188; 385/116

[56] References Cited

U.S. PATENT DOCUMENTS

| | | | |
|---|---|---|---|
| 3,188,188 | 6/1965 | Norton | 65/4.2 X |
| 3,216,807 | 11/1965 | Woodcock | 65/4.2 X |
| 3,265,480 | 8/1966 | Hicks | 65/4.21 |
| 3,301,648 | 1/1967 | Sheldon | 65/4.21 X |
| 3,588,221 | 6/1971 | Siegmund | 65/4.21 X |
| 3,615,313 | 10/1971 | Phaneuf | 65/4.2 X |
| 4,397,524 | 8/1983 | Yoshimura et al. | 65/4.2 X |

FOREIGN PATENT DOCUMENTS 60-233603  11/1985  Japan ..................... 65/4.3

*Primary Examiner*—Robert L. Lindsay

[57] ABSTRACT

Fiber composites, particularly for imaging, easy to manufacture even with great cross-sectional area, in which fibers are in a peak-to-valley relation with abutting pairs of fibers throughout.

39 Claims, 6 Drawing Sheets

METHOD FOR MAKING MULTIFIBER ASSEMBLY FROM PRIMITIVE TILES

RELATED APPLICATION

This application is a continuation of application Ser. No. 549,907, filed Jul. 9, 1990, now U.S. Pat. No. 5,049,176 which is a continuation-in-part of application Ser. No. 371,065, filed Jun. 26, 1989, abandoned.

BACKGROUND OF THE INVENTION

It is known in the prior art to bring together a multiplicity of optical fibers in peak-to-valley relationship, and to fuse them then into subassemblies later then fused together to produce a final array, as in Woodcock U.S. Pat. No. 3,216,807, "Method for Making Fiber Optical Devices", issued Nov. 9, 1965.

It is known also to bring together a multiplicity of three-filament fibers, each with a larger center filament and two smaller filaments fused, 180° apart, to the larger one, in a relationship peak-to-valley with respect to the larger center portion, the smaller fiber portions being accommodated by the valleys, into fused subassemblies; and to bring a multiplicity of these subassemblies, with the same peak-to-valley and smaller filament relationships, into a fused array, as in Phaneuf U.S. Pat. No. 3,615,313, "Method of Making Optical Fibers, Image Transfer Devices", issued Oct. 26, 1971. This patent also discloses multifibers with two opposed outer rows in which adjacent fibers do not abut, but rather are gapped therebetween.

It is known also in the art to make a multifiber element of as many as almost 8000 fibers by bringing together that many single fibers in a jig, with all fibers in each outer row abutting, and then drawing and sintering, following which a multiplicity of such multifibers are brought together and sintered to increase cross-sectional area accordingly.

It has been taught to use flowing water to bring into alignment a randomly related group of loosely related image fibers, as in Yoshimura et al. U.S. Pat. No. 4,397,524, "Image-Transmitting Bundled Optical Fibers", granted Aug. 9, 1983.

SUMMARY OF THE INVENTION

We have discovered that tiling elements useful in the manufacture of fiber arrays may desirably be made by forming smaller tiling elements with at least two adjacent outer rows in which there are gaps, and then fitting tiling elements together so that ungapped outer fibers of one tiling element interfit with gapped portions of an abutting tiling element.

We have discovered that such products may desirably be made by first, making tiling elements having a central portion, a penultimate fiber row, and an ultimate fiber row (i.e., respectively, the next-to-outer fiber row and the outer fiber row), fibers in the central portion being in peak-to-valley relation with six abutting pairs of fibers, including all the pairs of the penultimate fiber row, and the ultimate fiber row being gapped (i.e., certain fibers of the row are omitted), fibers present in the ultimate row being in peak-to-valley relation with two abutting fibers of the penultimate row; and, second, mating the gapped-outer-row assembly with another gapped-outer-row assembly which interfits therewith so that, where mating, peripheral gaps are filled by fibers, ultimate row fibers of mating portions and adjacent penultimate portions, as of all peripheral mating fibers being in peak-to-valley relation with six pairs of fibers, mating being done so that no surrounded gap of greater than peak-to-valley size exists between any fibers of the mated tiling element.

In preferred embodiments, tiling elements to be mated are identical, rotationally symmetrical (i.e., the identical fiber pattern repeats with every sixty-degree rotation about the center of the tile), and handed (i.e., looked at from one end the tile element—and thus, finally, the tile—shape is the mirror image of that seen from the other end), and the fibers are round.

In preferred methods of the invention, fibers are brought together in a hexagonal configuration, with all fibers in peak-to-valley relation to any pair of abutting fibers, and the ultimate row being ungapped and with tangents to the row fibers' outer extremities defining a hexagon; following which the ultimate row is gapped as desired by removing certain fibers; preferably half the number in the adjoining penultimate row if the number in that row is even, and half the said number but rounded either up or down a half to get the higher or lower integer if the penultimate row has an odd number. Preferably in selecting which fibers to remove, one starts with a corner fiber (i.e., one which exists in two intersecting rows), removes from adjacent it the desired number, moves on to the next corner in the same rotational direction, repeats the process, and so on six times.

In another preferred method of the invention, tiles and tile elements may be advantageously manufactured using in the formation of its multifiber element our new process of first forming a strand from a multiplicity of fibers oriented each to each pair of abutting fibers in a peak-to-valley relation, tangents to a strand cross-section defining either an equilateral triangle or a regular hexagon (i.e., such tangents defining an isotropic polygon), and drawing and sintering to form a corresponding primitive; and thereafter forming at least one tiling element, larger in cross-section, by bringing together in a second strand a multiplicity of primitives, in peak-to-valley relation, and drawing and sintering this multiplicity together.

In preferred embodiments, the fibers are round in outside diameter, and distilled water is used to wet the sintered primitives in making up the tiling elements made from them and to so wet these yet larger tiling elements in making up further yet larger strands.

We have discovered also the new tiling elements referred to, in which all fibers are in peak-to-valley relation with pairs of abutting fibers, and in which that species of tiling elements also called tiles (disks, i.e., cut from more elongated tiling elements) are characterized by handedness (i.e., if a disk made from a second or larger tile is turned over, the periphery seen in top plan view is not identical with that seen in the first disk position, but rather its mirror image), so that to obtain full peak-to-valley interfitting according to the product invention, whereby tile junctions are not apparent on microscopic examination of a cross-section, all tiling elements or tiles of the invention used in making up a larger size must have common handedness.

Tiling elements of the present invention are novel in another aspect in that they have a greater regularity within multifibers, and a greater perfection along multifiber interfaces than those of the prior art, as apparent microscopically. Indeed, in both respects, unlike the prior art, freedom from any fiber to fiber or multifiber to multifiber imperfection is almost complete, and thus approaches or reaches microscopic invisibility.

PREFERRED EMBODIMENT

We turn now to a description of a preferred embodiment, shown in the drawings and described in structure and operation.

DRAWINGS

Figure 3:
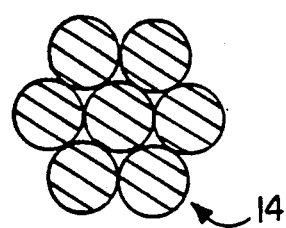
Figure 4:
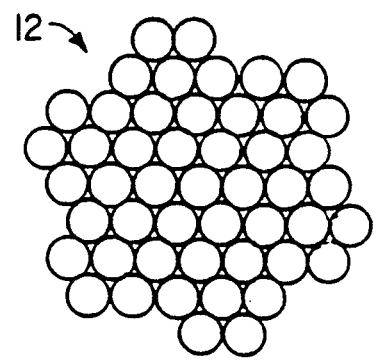
Figure 5:
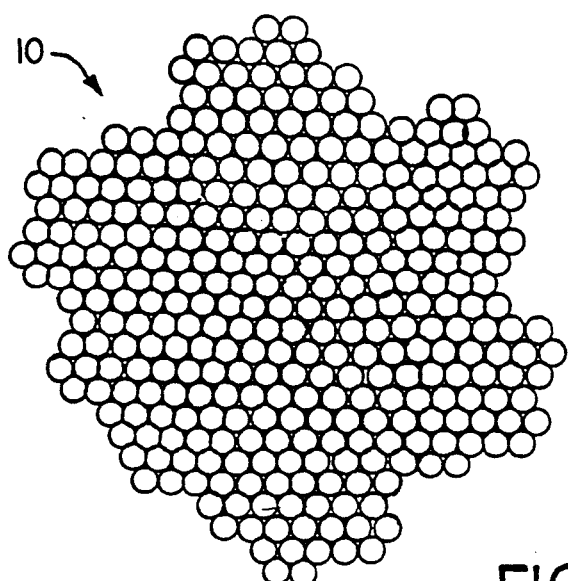

FIGS. 3, 4, and 5 are diagrammatic, enlarged views at different scales of primitive, second- and third-stage multifiber elements of one preferred embodiment.

Figure 6:
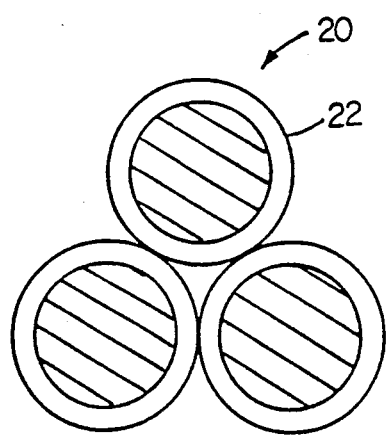
Figure 7:
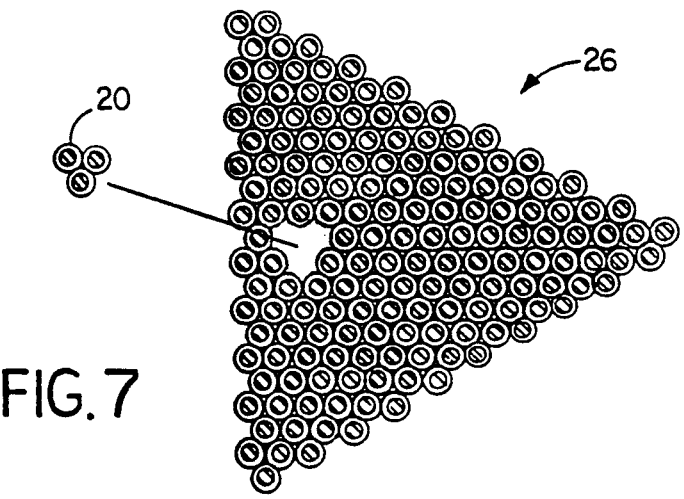
Figure 8:
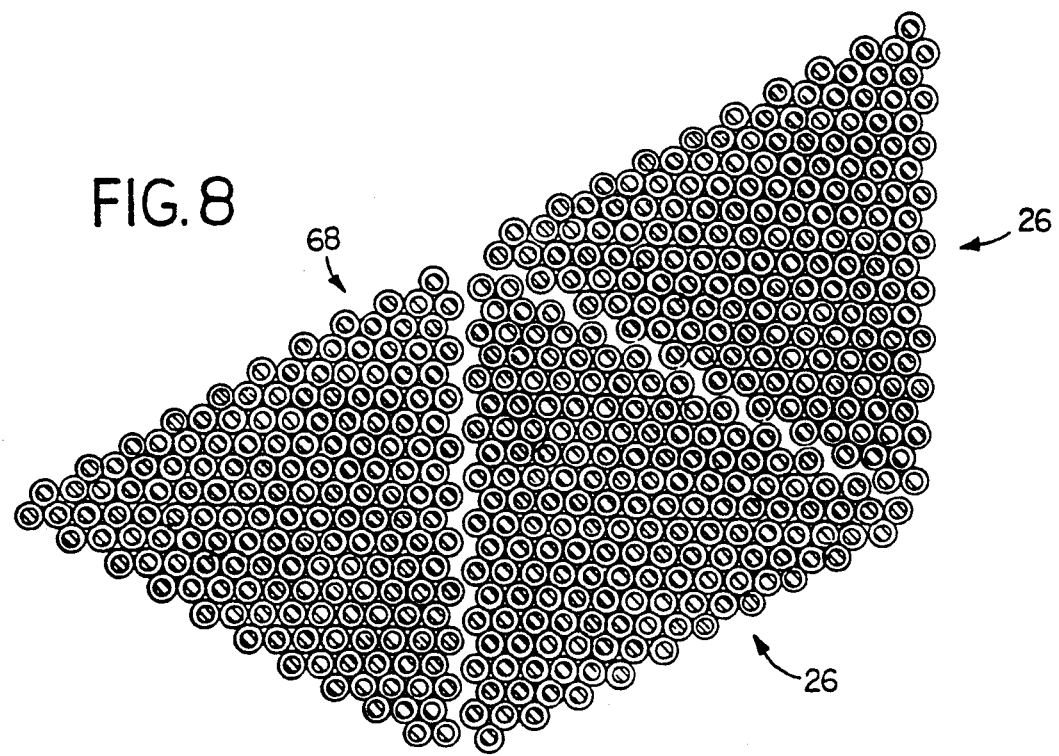
Figure 9:
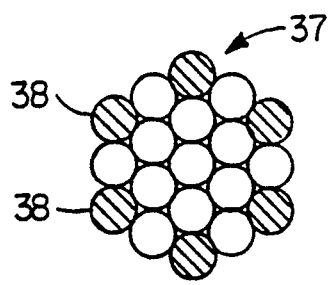
Figure 10:
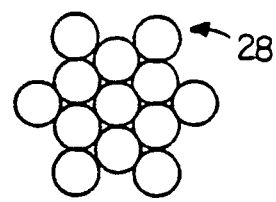
Figure 11:
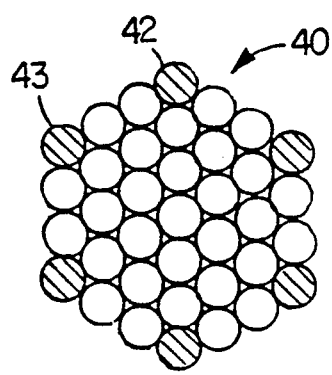
Figure 12:
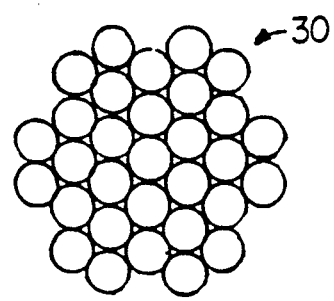
Figure 13:
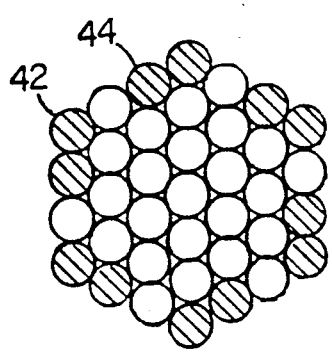
Figure 14:
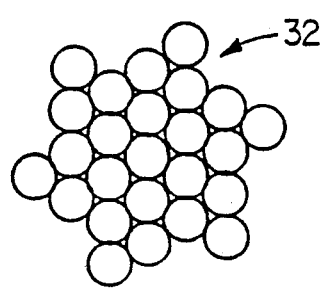

FIGS. 6-8 are diagrammatic, enlarged views at different scales of different stage multifibers of overall triangular shape according to the invention.

FIGS. 9 and 10, FIGS. 11 and 12, FIGS. 13 and 14, FIGS. 15 and 16, and FIGS. 17 and 18 are pairs of diagrammatic views showing multifiber element fiber groupings before and after, respectively, removing fibers in the outer rows thereof to obtain first-order complex tiles according to one aspect of the invention.

FIG. 19 illustrates successive steps in producing tiling elements according to certain aspects of the invention.

Figure 20:
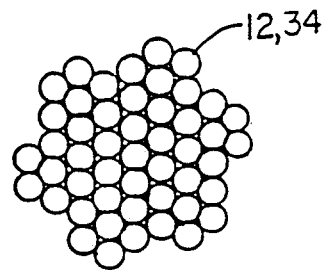
Figure 20:
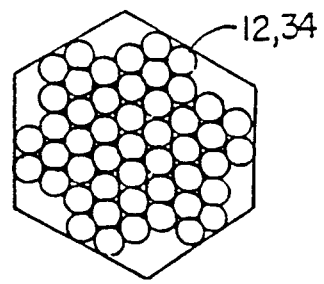

FIG. 20 illustrates a characteristic of another tiling element according to the invention.

STRUCTURES AND METHODS

Figure 1:
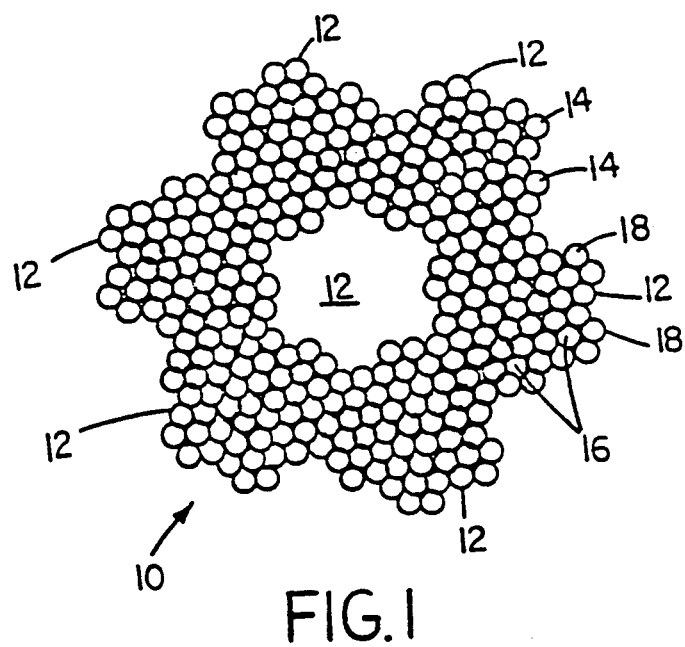
FIG. 1 is a diagrammatic, enlarged view of a third-stage multifiber of the preferred embodiment.

There is shown in FIG. 1 a third-stage multifiber indicated generally at 10, and made of seven second-stage multifibers 12 (the central multifiber 12 being shown only in outline, to conduce to better understanding of the shapes and relationships of multifibers 12), each of the latter made up in turn of seven primitive (first-stage) multifibers 14 each made up of seven fibers having cylindrical outer surfaces of the same diameter, a central fiber 16 and six fibers 18 around it in hexagonal array.

According to a preferred embodiment of the method of the invention to manufacture the multifiber of FIG. 1, we first bring together seven "monofibers" (monofiber preforms), in the center and hexagonal orbit relationship shown in primitive 14. These preforms are cylindrical light pipes with a central portion and a cladding annulus, as well known in the art, and an outside diameter of 2.54 centimeters. They are then drawn and sintered together in the relationship just mentioned to form a primitive, to reduce the diameter to one-tenth of what each was (i.e., the diameter of each single component of the seven becomes 0.254 centimeters). The result is the primitive tiling element.

Next, seven of these primitives are brought together in a one in center six hexagonally surrounding relationship, taking care that each component of each tile is in peak-to-valley relation with each of abutting components of adjacent primitives. The components are wet with distilled water so that surface tension effects facilitate mating and temporary adherence in position. They are then drawn and sintered into a unitary second-stage pretile element, to reduce the diameter of this second-stage pretile, or tiling element, and all its components to one-tenth the second-stage diameters. The diameter of each of the forty-nine monofibers present is now 0.0254 centimeters. Thus results the second-stage tiling element.

Seven second-stage tiling elements are then brought together in the same (one in center and the others generally hexagonally around it) way, just as shown in FIG. 1. Again, distilled water is used to wet the seven, for the same purpose as above. Care must be taken that all these second-stage elements, which have handedness, are oriented in their axial directions so that each of the seven has the same handedness. Again, each peripheral component (fiber) of each tile is oriented so as to be in peak-to-valley relation with each pair of fibers it abuts in an abutting element. Drawing and sintering (fusing) then integrates the seven into a third-stage tiling element, drawn down to one-tenth its diameter, and that of its fibers, so that the diameter of the 343 fibers present is now 0.0025 centimeters.

Enough third-stage elements are then brought together to form a fourth-stage array about 2.5 centimeters in diameter. This of course requires dozens of third-stage tiling elements. The same care must be exercised to match handedness and seek that peak-to-valley relations remain complete among fibers of abutting tiles. Water is again used in this step, for the same purpose. The fourth-stage array is then placed in a cylinder of softer, etchable, "bottle" glass, and sintered under vacuum, the heat of sintering not only fusing the fourth stage array but also softening and drawing in around the array the bottle glass, protecting peripheral configuration.

The elongated fourth-stage tiling element is then sliced into wafers (tile elements also called here tiles).

These tiles may then be fitted together in a jig to a much greater overall area, as desired. The same attention must be given to handedness and the complete maintenance of the same sort of peak-to-valley relations of these tiles as was given with the lower stage tiling elements.

Final sintering to produce an element of considerable area follows, using for example a suitable heated press.

After assembly of each stage (after the primitive) to be sintered into a tiling element, while still wet, a rubber band is placed around the assembled bundle, which is then dried out before drawing and sintering.

According to the presently most preferred embodiment of the method invention, we use as our first stage tiling element not a primitive as above described, but rather a more complex element in which preferably all the outer fiber rows are gapped.

Figure 15:
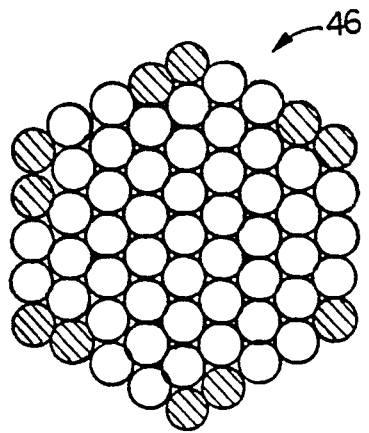
Figure 16:
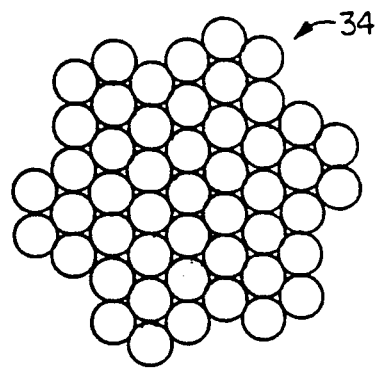
Figure 17:
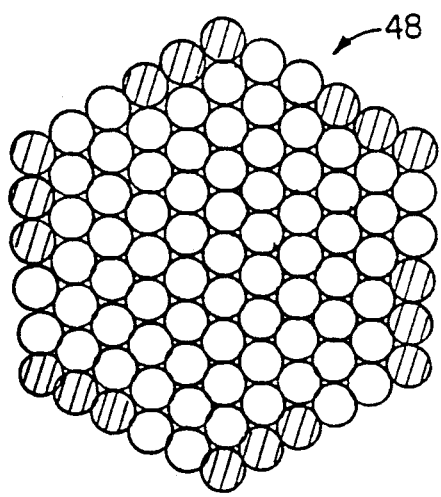
Figure 18:
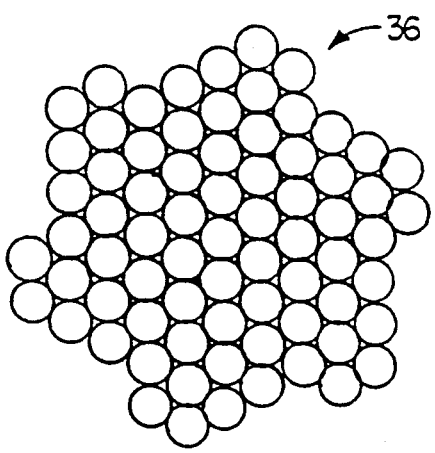

One embodiment of the method of this approach is illustrated in FIGS. 15 and 16. We first bring together dry in a jig 61 canes in the hexagonal array 46 shown in FIG. 15. We then remove the twelve canes shaded in FIG. 15, to produce the 49-cane first-stage complex tiling element 34 of FIG. 16. Following a first drawing and sintering step, 49 of these 49-fiber multielements are wetted and brought together in a jig, with, of course, all abutting fibers in peak-to-valley relation. A second drawing and sintering step follows. The result is a tiling element, after only two draws, corresponding exactly with the fourth stage tiling element described above in connection with our process that begins with a primitive tile, with consequent production economics.

Tiling elements 28, 30, 32, and 36 of FIGS. 10, 12, 14, and 18, respectively, are made up from precursors 37, 40, 44, and 48 of FIGS. 9, 11, 13, and 17, respectively.

Tiling elements 32, 34, and 36 are handed. Tiling elements 28 and 30 are not.

Embodiments of the method and product involving beginning with a primitive are shown, using the three-fiber triangular primitive 20 in FIG. 19. In FIG. 19(b) three of the primitives 20 are shown, exploded for clarity, making up the second-stage multifiber 60. FIG. 19(c) demonstrates that tangents 62 the locus of outer extremities of the outer fiber rows of multifiber 60 define an equilateral triangle. FIG. 19(d) shows a larger, handed multifiber 64 formed by bringing together three multifibers 60. FIG. 19(e) shows a still larger, still handed multifiber 66 formed by bringing together three multifibers 64.

Another way of using the triangular primitive 20 is shown in FIGS. 7 and 8. In this aspect of our invention, we are able to bring together loosely in a jig a complex first-stage tiling element, as shown at 26 in FIG. 7, without removal of any fibers from a precursor. It will be seen that outer rows are gapped, that outer faces are identical, that there is rotational symmetry, and that these first-stage complex tiling elements fit together in order to form larger second-stage arrays, as shown at 68 in FIG. 8.

FIG. 20 illustrates that the tiling element 12, 34 is such that tangents 70 connecting the outer extremities of its outer rows of fibers define a regular hexagon.

The outer row gaps and other planned irregularities producing in outer tile element peripheries troughs of size greater than those defined by two fibers abutting at a point on the line connecting their axes (the classic peak-to-valley trough) provides for much easier and more accurate mating of adjoining tiling elements; it is as though a tiny set of jigs are built into each tiling element, much more effective than the classic peak-to-valley trough in enabling both imperceptible tile element interfaces and, through enabling use of smaller tiling elements and so less peak-to-valley-only "jigging" (as characteristic of the primitives and first-stage complex tiling elements of the present invention, and the large prior art multifibers, although our approach makes it necessary to use this peak-to-valley jigging for small numbers only, where it is more practical, unlike the prior art which may rely on a many-thousand-fiber first stage, and then try to peak-to-valley interfit those first-stage elements.

Figure 19A:
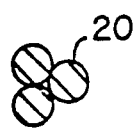
Figure 19B:
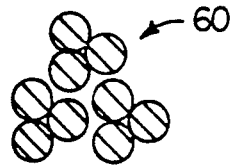
Figure 19C:
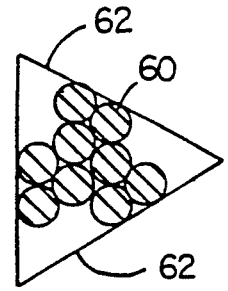
Figure 19D:
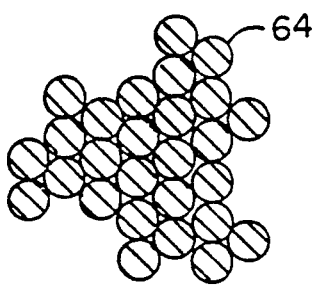
Figure 19E:
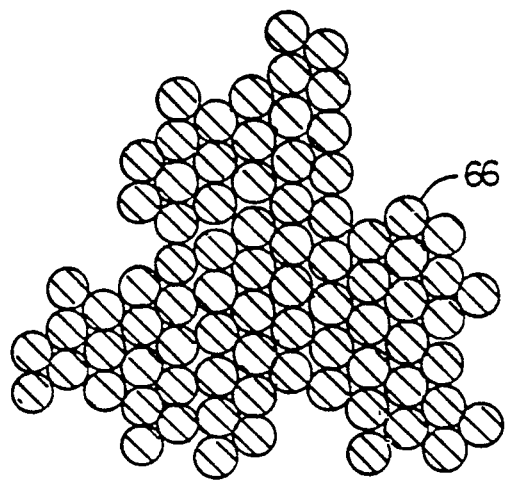

As will be seen, in certain embodiments of the invention, the gap is at its narrowest point the width of one fiber, and has a depth of half a fiber width (e.g., FIGS. 7, 10, 12, and 19(c)). In others the depth is the same, but gaps are wider (e.g., FIGS. 4, 14, 16, 18). FIG. 19(d) manifests both types of the just-mentioned gaps. Still other tiling elements include much larger gaps (e.g., FIGS. 1, 5, and 19(e)). Yet all have plane tilability with other identical tiling elements.

OPERATION

The method of our invention provides products of our invention which may be given much greater area than was possible in the prior art, while at the same time giving much greater freedom from image distortion, whether in optical (e.g., fiber optic faceplate) or electronic (e.g., microchannel plate) applications. It provides beautifully ordered, essentially free of "shear" (lateral change of relationship among fibers between an imaging input and an image output end), elements.

All the products of the invention are characterized by hexagonal lattices, so distances between fiber centerlines are the same in all directions.

OTHER EMBODIMENTS

Figure 2:
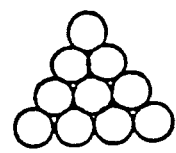
FIG. 2 is a diagrammatic, enlarged view of an alternative embodiment primitive.

Primitives may include any desired number of fibers (components, including preforms or canes). Thus triangular primitives, such as shown in FIG. 2, may have three, ten (as in FIG. 2), or any other number the cross-section of which defines by tangents to its outer fiber surfaces an equilateral triangle. Similarly, primitives as in FIG. 1 may be characterized by not only 7, but as well by 19, 37, or more fibers, connecting tangents to outer fiber outer surfaces, in cross-section, continuing to define regular hexagons.

In all the tiling elements above shown, the said elements are plane "tilable" (i.e., come together by lateral movement only, no longitudinal (as with jigsaw puzzle pieces) being necessary); however, an approach calling for such movement, done so as to produce no gapping internal of (surrounded by) any multifiber is within the scope of the invention.

Fibers of embodiments of the invention may be of glass or other materials (e.g., plastic, as in plastic optical fibers). Glass fibers may be solid (as for light guides) or hollow, as for microchannel plates. Bonding may be by suitable means, as adhesion or cohesion.

Still other embodiments will occur to those in the art, and are within the claims.

What is claimed is:

1. A method of making a multifiber element comprising the steps of
   forming an isotropic primitive tiling element, and
   uniting said primitive tiling element with a plurality of other such tiling elements to form a second-stage tiling element,
   each fiber of each said second-stage tiling element being in peak-to-valley relation with each adjacent pair of fibers.

2. The method of claim 1 in which said fibers have a cylindrical outside diameter, each said diameter being the same.

3. The method of claim 2 in which said primitive tiling element consists of a central fiber surrounded by six fibers arranged in a peak-to-valley regular hexagon pattern around said central fiber.

4. The method of claim 3 in which each said second-stage tiling element is made up of seven said primitive tiling elements, a central said primitive tiling element and six primitive tiling elements therearound in peak-to-valley relation therewith.

5. The method of claim 4 in which said second-stage tiling element is united with a plurality of additional second-stage tiling elements to form a third-stage tiling element, each fiber in said third-stage tiling element being in peak-to-valley relation with each adjacent pair of fibers.

6. The method of claim 5 in which each said third-stage tiling element is made up of seven said second-stage tiling elements, a central said second-stage tiling element and six said second-stage tiling elements therearound.

7. The method of making tiling elements larger than third-stage by uniting a plurality of said third-stage tiling elements, each fiber in the resultant multistage tiling element being in peak-to-valley relation with each adjoining pair of fibers.

8. The method of making a larger multifiber by uniting a plurality of smaller multifibers, each said smaller multifiber including an isotropic primitive tiling element and each fiber in said larger multifiber being in peak-to-valley relation with each adjacent pair of fibers.

9. The method of claim 1 or claim 8 in which a liquid is used in said uniting to provide surface tension aid in holding together during manufacture the tiles being united.

10. The method of claim 9 in which said liquid is distilled water.

11. A multifiber optical element comprising
a central isotropic primitive tiling element and a multiplicity of tiling elements surrounding said central tiling element, each fiber in said element being in peak-to-valley relationship with each abutting pair of fibers.

12. The element of claim 11 in which said primitive tiling element consists of a central fiber with six fibers around it in peak-to-valley hexagonal array, said multiplicity are six, and are each identical with said central tiling element, and all tiling elements are made up of fibers with outside surfaces cylindrical and of the same diameter.

13. The element of claim 12 in which surrounding said multiplicity are a further multiplicity of tiling elements, six in number, and each consisting of a said central tiling element surrounded by said multiplicity of claim 12, each fiber in said element being in peak-to-valley relationship with each abutting pair of fibers, to provide a third-stage tiling element.

14. The method of claim 6 in which tiling elements of at least one stage are drawn to reduce the diameters thereof and of the components thereof.

15. The method of claim 14 in which the tiling elements of all three stages are so drawn.

16. The element of claim 13 in which surrounding said further multiplicity are an additional multiplicity of tiling elements, six in number, and each consisting of a tiling element as set forth in claim 13, each fiber in said element being in peak-to-valley relationship with each abutting pair of fibers.

17. The method of making tile wafers which comprises slicing transversely through an elongated handed tiling element.

18. The method of making elements of area larger than said wafers of claim 17 which comprises assembling a plurality of said wafers, with each fiber in abutting elements in peak-to-valley relationship with each abutting pair of fibers.

19. The method of claim 13 in which a multiplicity of said third-stage tiling elements are brought together with each fiber in peak-to-valley relation to each pair of abutting fibers, and the resulting array is placed in a tube of bottle glass, which is evacuated and heated to sinter said multiplicity and form said bottle glass thereonto.

20. The method of claim 19 in which the product of said claim is wafered, said bottle glass is etched away, and the resultant thin tiles are fitted together with each fiber in abutting tiles in peak-to-valley relationship with each abutting pair of fibers.

21. A larger tiling element comprising a plurality of smaller tiling elements, said smaller tiling elements each including at least two adjacent gapped outer rows, and said tiling elements interfitting to leave no gap except along outer rows in said larger tiling element, all contacting fibers being in peak-to-valley relation with adjoining pairs only.

22. The larger tiling element of claim 21 in which the interface between said smaller tiling elements is nearly microscopically imperceptible.

23. The larger tiling element of claim 22 in which fiber-to-fiber interrelationships are nearly free from imperfections.

24. A tiling element comprising
an inner portion constituting a multiplicity of fibers, said fibers being in peak-to-valley relation each with pairs of abutting fibers, and
a multiplicity of outer rows of fibers,
at least two adjacent said outer rows each being gapped so that not every fiber of said outer rows abuts another fiber of the same outer rows.

25. The tiling element of claim 24 in which said fibers are round in cross-section.

26. The tiling element of claim 25 in which each of said outer rows is identical with each other of said outer rows.

27. The tiling element of claim 26 in which there are six said outer rows, and said tiling element is rotationally symmetrical.

28. The tiling element according to claim 7 which is one of FIGS. 1, 4, 5, 14, and 18.

29. The tiling element according to claim 6 which is one of FIGS. 7, 8, and 19(c), (d), and (e).

30. The product of the method of claim 4, 6, or 7.

31. A tiling element comprising at least 10,000 fibers, said tiling element having all its fibers in peak-to-valley relation and being characterized by novel freedom from imperfections at fiber junctions.

32. The method of making a tiling element which comprises
assembling a bundle of loose fibers in a cross-sectional relationship relative to one another as set forth in claim 26, and thereafter sintering said fibers into an integral multifiber.

33. The method of claim 32 in which said bundle is assembled in a jig.

34. The method of claim 32 in which said bundle is assembled into a relationship which is a regular hexagon in cross-section, and predetermined fibers are then removed.

35. The method of making a tiling element which comprises bringing together loosely in a jig, with all abutting fibers in peak-to-valley relation with pairs of abutting fibers, a multiplicity of the tiling elements of claim 26, and thereafter sintering to produce an integral structure.

36. A method of forming a multifiber optical element comprising the steps of
forming a plurality of first-stage tile elements,
each said first-stage tiling element including a plurality of fibers that are all in peak-to-valley relation with each adjacent pair of fibers,
the shape of said first-stage tiling element being such that lines perpendicular to the longitudinal axes of said fibers and tangent to the outermost fibers form an equilateral triangle or equilateral hexagon,
said forming including sintering together fibers in said peak-to-valley relation,
uniting said first-stage tiling elements together to form a second-stage tiling element,
each fiber at interfaces between said primitive tiling elements in said second-stage tiling element being in peak-to-valley relation with each adjacent pair of fibers of other first-stage tiling elements at the interfaces,
said uniting including sintering together said first-stage tiling elements.

37. The method of claim 36 wherein each said first-stage tiling element is a primitive tiling element having a shape such that lines tangent to the outer perimeter of said tiling element form an equilateral triangle or equilateral hexagon.

38. The method of claim 37 wherein said forming includes drawing the fibers to reduce the diameters of the fibers.

39. The method of claim 38 wherein said uniting includes drawing the first-stage tiling elements to reduce the diameters of the fibers further.

* * * * *